United States Patent [19]
Steisslinger et al.

[11] 3,747,884
[45] July 24, 1973

[54] STAND FOR PHOTOGRAPHIC APPARATUS

[75] Inventors: Kurt Steisslinger; Willi Weidenbach; Ernst Lutz, all of Stuttgart Germany

[73] Assignee: Eastman Kodak Company, Rochester, N.Y.

[22] Filed: June 18, 1971

[21] Appl. No.: 154,576

[30] Foreign Application Priority Data
June 25, 1970 Germany.......................... 70238641

[52] U.S. Cl. ............................................... 248/181
[51] Int. Cl. ................................................ F16m 13/04
[58] Field of Search ................ 248/181, 414, 408; 287/12; 95/86

[56] References Cited
UNITED STATES PATENTS

| 2,670,228 | 2/1954 | Pagliuso | 248/181 |
| 3,575,369 | 4/1971 | Tetlow | 248/181 |
| 2,017,627 | 10/1935 | LaHodny | 287/12 |
| 2,310,025 | 2/1943 | Grern et al. | 287/12 |
| 2,352,699 | 7/1944 | Ennis | 248/181 |
| 2,354,937 | 8/1944 | Barker | 248/181 |
| 2,548,659 | 4/1951 | Epprecht | 248/181 |
| 2,932,481 | 4/1960 | Breer et al. | 248/408 |
| 3,211,405 | 10/1965 | Fey et al. | 248/181 |
| 3,212,740 | 10/1965 | Greenberg | 248/181 |

FOREIGN PATENTS OR APPLICATIONS

| 1,190,645 | 5/1970 | Great Britain | 95/86 |
| 1,197,716 | 7/1965 | Germany | 95/86 |
| 287,247 | 3/1953 | Switzerland | 95/86 |

Primary Examiner—Marion Parsons, Jr.
Attorney—W. H. J. Kline et al.

[57] ABSTRACT

A stand for supporting a photographic camera includes a base and a connecting arm. The arm is movably supported within a bearing in the base by a spring washer. In one embodiment, the arm may be folded into a recess in the base for storage. In a second embodiment, the bearing and arm are vertically movable within the base for storage.

1 Claim, 11 Drawing Figures

PATENTED JUL 24 1973

KURT STEISSLINGER
WILLI WEIDENBACH
ERNST LUTZ
  INVENTORS

BY Robert F. Brothers
W.H.J. Kline
ATTORNEYS

KURT STEISSLINGER
WILLI WEIDENBACH
ERNST LUTZ
       INVENTORS

STAND FOR PHOTOGRAPHIC APPARATUS

BACKGROUND OF THE INVENTION

1. Field of the Invention

The present invention relates to photographic apparatus and in particular to a camera stand equipped to receive and support a photographic camera.

2. Description of the Prior Art

The use of tripods to support cameras during film exposure is well known in the art. Such tripods are extremely useful during long exposure times or to prevent camera movement under certain picture taking conditions. However, most such tripods consist of either three or four support legs, each of which is independently adjustable to different positions, and in addition include relatively complex camera mounting mechanisms which permit the camera to be adjusted with respect to the tripod legs. Such apparatus is of great utility to the professional photographer or the more skilled amateur who may take pictures under many varying types of conditions which require the complicated construction associated with these tripods. However, with the advent of simpler inexpensive cameras, there is need for an equally simple inexpensive camera stand which is easily used and which may be carried by the relatively unskilled amateur photographer for use in most picture taking situations.

SUMMARY OF THE INVENTION

Accordingly, an object of the present invention is to provide a camera stand which is adapted to receive and support a photographic camera and which is relatively compact and simple to use.

Another object of the invention is to provide such a stand which is easily stored and easily assembled with the photographic camera.

A still further object of the invention is to provide such a camera stand which is relative inexpensive to produce.

To meet these and other objects, the present invention provides a camera stand which includes a support base and a connecting arm which terminates at its lower end in a ball head which is frictionally held by a spring washer within the support base. The support base is further provided with a recess into which the connecting arm may be rotated when the camera stand is disassembled from the camera, with the connecting arm being either wholly or partially contained within the support base. The support base may also be provided with an arresting screw for adjusting the force applied to the ball head to assist in stabilizing the connecting arm in its operative position.

In the simplest form of the invention, the connecting arm is held in position only by friction between the ball head and spring washer. To assist in removing the camera from the connecting arm, means are provided to prevent turning of the arm when in its lowered position.

Accordingly to one embodiment of the invention, one end of the connecting arm is threaded to mate with a threaded receptacle in the camera. In another embodiment, a centering stud and latch is provided on the connection arm for locking the arm to the camera.

According to another embodiment of the invention, the connecting arm and spring washer are movable substantially vertically within the base between a stored position in which the connecting arm is contained within the base and an extended operative position in which the connecting arm is locked in an extended position.

In a still further embodiment of this invention, an adapter is illustrated for assembling a connecting arm which is adapted for use with one type of camera with a different type of camera. In one embodiment, an adapter assembles a stud and latch equipped connecting arm to a camera with a threaded receptacle. In a second embodiment, an adapter assembles a threaded connecting arm to a camera with a stud and latch type connecting mechanism.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Because photographic apparatus is well known, the present description will be directed in particular to apparatus forming part of, or cooperating more directly with, a camera stand in accordance with the present invention. It is to be understood that elements of photographic apparatus not specifically shown or described may take varous forms well known to those skilled in the art.

Figure 1:
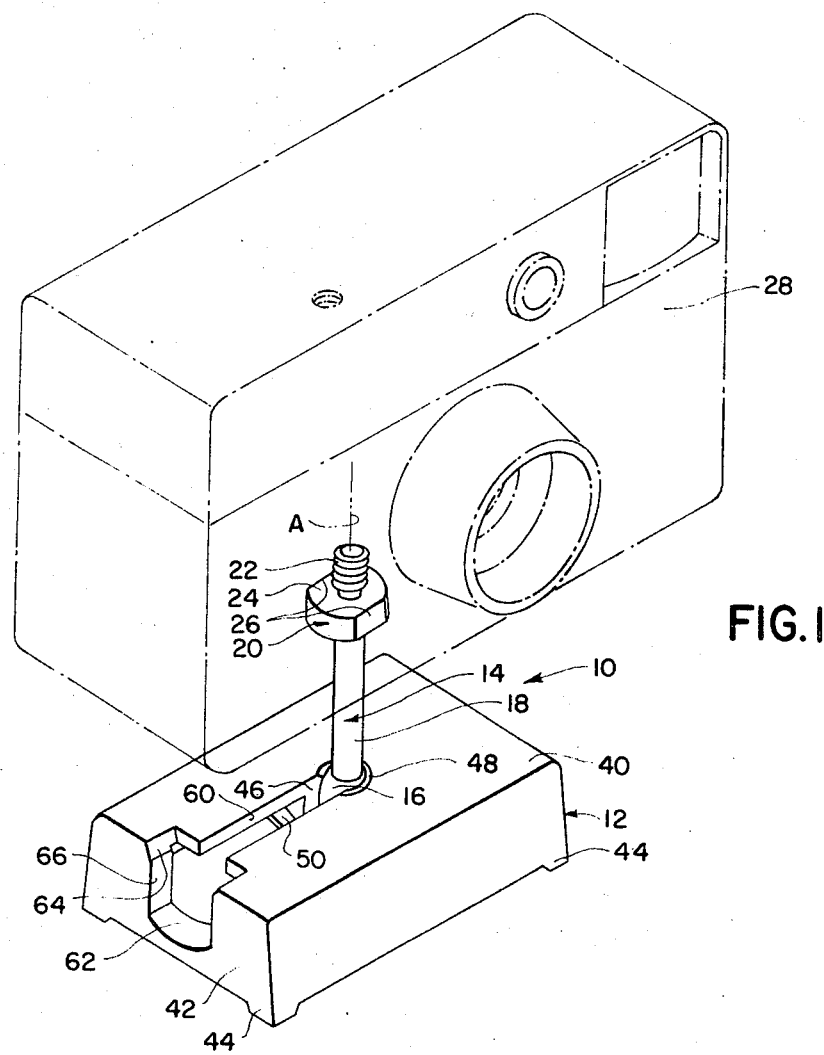
FIG. 1 shows a perspective view of a camera stand according to the present invention, with the connecting arm in its operative position for assembling to a camera (shown in phantom)
Figure 2:
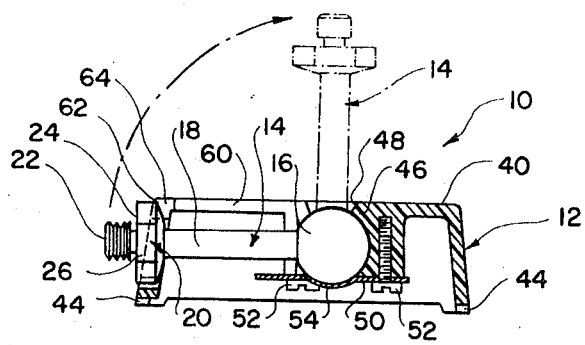
FIG. 2 is a sectional view of the camera stand of FIG. 1 with the connecting arm in its stored position.
Figure 3:
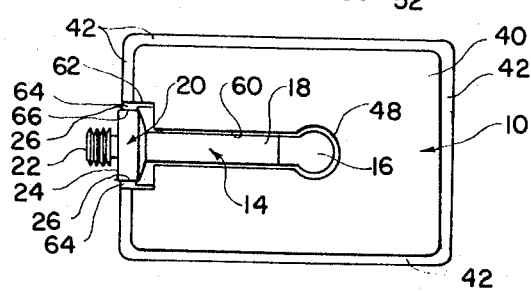
FIG. 3 is a top view of the camera stand of FIGS. 1 and 2, with the connecting arm shown in its stored position.

Referring first to FIGS. 1, 2 and 3, a camera stand shown generally as 10 includes a base 12 and a connecting arm 14. Connecting arm 14 has a longitudinal axis A and opposing end portions and consists of a ball end 16 at one end portion of arm 14, a shaft 18 extending from ball end 16, a flange 20 on the other end portion of arm 14, and a screw end 22 extending from flange 20. Flange 20 has a flat upper surface 24 and a pair of opposed flat surfaces 26, each substantially perpendicular to surface 24. Screw end 22 is threaded so as to mate with a suitable receptacle in a camera shown generally as 28, which is to be mounted on camera stand 10.

Base 12 includes a generally flat upper surface 40, downwardly depending sidewalls 42, which extend from surface 40 and terminate in support feet 44 at the intersection of each pair of depending walls 42, and a bearing 46. Bearing 46 is located in the hollow interior of base 12 and includes an aperture 48 in its upper surface through which shaft 18 of connecting arm 14 may extend. Baring 46 is preferably spherical and of such a radius as to mate with ball end 16 of connecting arm 14 when shaft 18 is inserted through aperture 48. A spring washer 50 is mounted to the lower surface of bearing 46 by means of screws 52. Spring washer 50 is generally flat and has a central portion 54 which is spherical and of such a radius as to mate with ball end 16 of connecting arm 14 so as to produce a frictional force upon ball end 16 under the urging of screws 52.

Surface 40 of base 12 is cut out to form a generally rectangularly aperture 60 which extends from aperture 48 outwardly toward one of the sidewalls 42 of base 12. Aperture 60 is of sufficient width that shaft 18 of connecting arm 14 may pass through the aperture. Aperture 60 terminates in an enlarged access opening 62 defined by beveled edges 64 in surface 40 which extend into sidewall 42 and intersect sidewalls 66 of opening 62. Opening 62 is of sufficient width and depth to accept flange 20 on connecting arm 14 with flatened edges 26 mating with the sidewalls 66 of opening 62 and beveled edges 64 assisting in the engagement of flange 20 with opening 62.

Camera support stand 10 is shown with connecting arm 14 in its stored position in FIGS. 2 and 3. It may be seen that flange 20 on connecting arm 14 fits into opening 62 with flat surfaces 26 engaging sidewalls 66, thereby preventing rotation of conneting arm 14 around longitudinal axis A. Screw end 22 may now be inserted into a suitable mating receptacle in camera 28 and, by rotation of camera support stand 10, screw end 22 may be assembled to the camera. Rotation of connecting arm 14 about ball end 16 is now possible against the frictional force between spring washer 50 and ball end 16 so that shaft 18 passes through aperture or recess 60 and assumes a generally upright position with respect to camera support stand 10, as shown in FIG. 1. After leaving recess 60, connecting arm 14 is free to rotate about longitudinal axis A. Movement of connecting arm 14 to its fully upright position can be arrested at any point, so that the camera may be adjusted or for taking picutres on an angle. Camera stand 10 may now be set upon a horizontal surface and camera 28 may be operated as with any tripod supported camera. For additional stability, bearing 46 may be located in base 12 so that shaft 18 is of sufficient length to permit the operator to insert his hand between camera 28 and base 12. Removal of camera 28 from connecting arm 14 is facilitated by return of arm 14 into recess 60 to prevent rotation of arm 14 about its longitudinal axis during the removal process.

Figure 4:
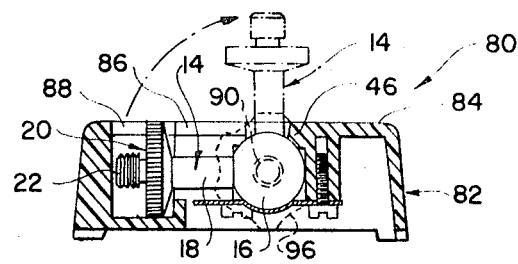
FIG. 4 is a sectional view of an alternate embodiment of the camera stand of this invention, showing an arresting screw associated with the ball head of the connecting arm.
Figure 5:
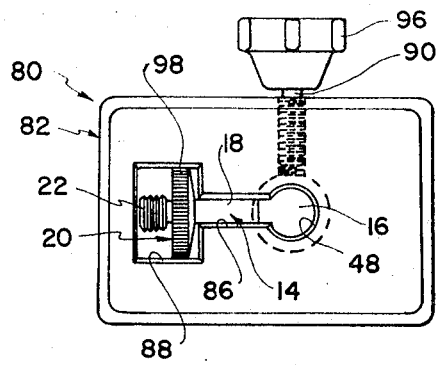
FIG. 5 is a top view of the camera stand illustrated in FIG. 4.

In the embodiment illustrated in FIGS. 4 and 5, connecting arm 14 is shown in its stored position within a base 82 of a camera stand 80. Connecting arm 14 is identical to that illustrated in FIGS. 1-3. Base 82 includes a bearing 46, and a top surface 80. Top surface 84 is cut out to form a generally rectangular aperture 86 which extends from aperture 48 in bearing 46, through which shaft 18 of connecting arm 14 extends when connecting arm 14 is in its extended position. Aperture 86 terminates in a generally rectangular shaped aperture 88 which is of sufficient dimensions to receive screw end 22 and flange 20 of connecting arm 14 when the connecting arm is in its stored position. Thus, the entire connecting arm 14 is stored within support base 82 in the embodiment illustrated in FIGS. 4 and 5. In addition, the embodiment includes means for applying an adjustable force to ball end 16 of connecting arm 14. A threaded spindle 90 extends into and through a threaded aperture 92 in bearing 46 in support base 82 so that inner end 94 of spindle 90 may be brought into contact with ball end 16. The outer end of spindle 90 terminates in a turning knob 96, by means of which rotary movement may be applied to spindle 90 thereby applying an adjustable force to ball end 16 of connecting arm 14. In addition, outer surface 98 of flange 20 is provided with a knurled surface for assiting in assembling connecting arm 14 to a camera 28.

Figure 6:
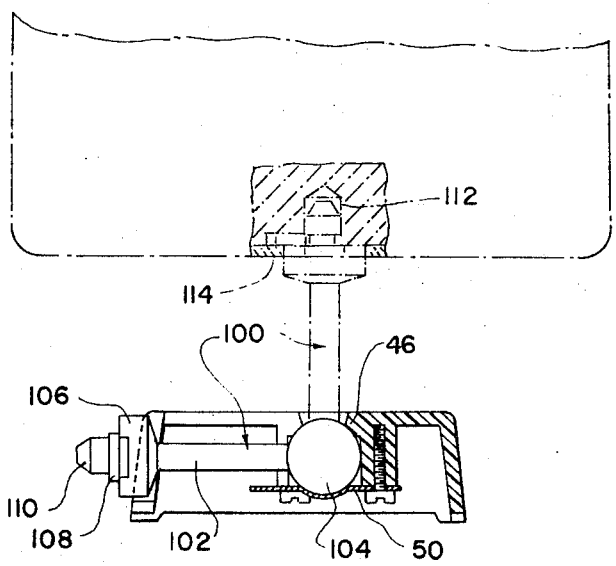
FIG. 6 is a sectional view of an alternate embodiment of a connecting arm according to this invention, with assembly of the connecting arm to a camera shown in phantom.
Figure 7:
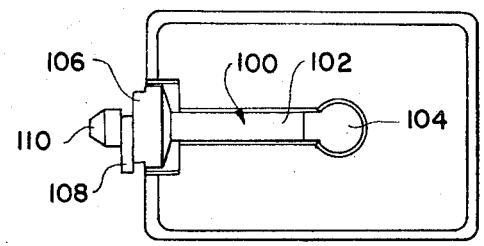
FIG. 7 is a top view of the embodiment illustrated in FIG. 6.

FIGS. 6 and 7 illustrate alternate means for securing a camera stand to a camera. Connecting arm 100 consists of a shaft 102, a ball end 104, a flange 106, a lug 108, and a stud 110. The base of the support stand, including bearing 46, spring washer 50, and the apertures are the same as illustrated in FIGS. 1-3. However, the camera now includes a centering hole 112 into which stud 110 on connecting arm 100 is inserted and a catch member 114 over which lug 108 is rotated after insertion of stud 110 into hole 112 during assembly of the camera stand to the camera.

Figure 8:
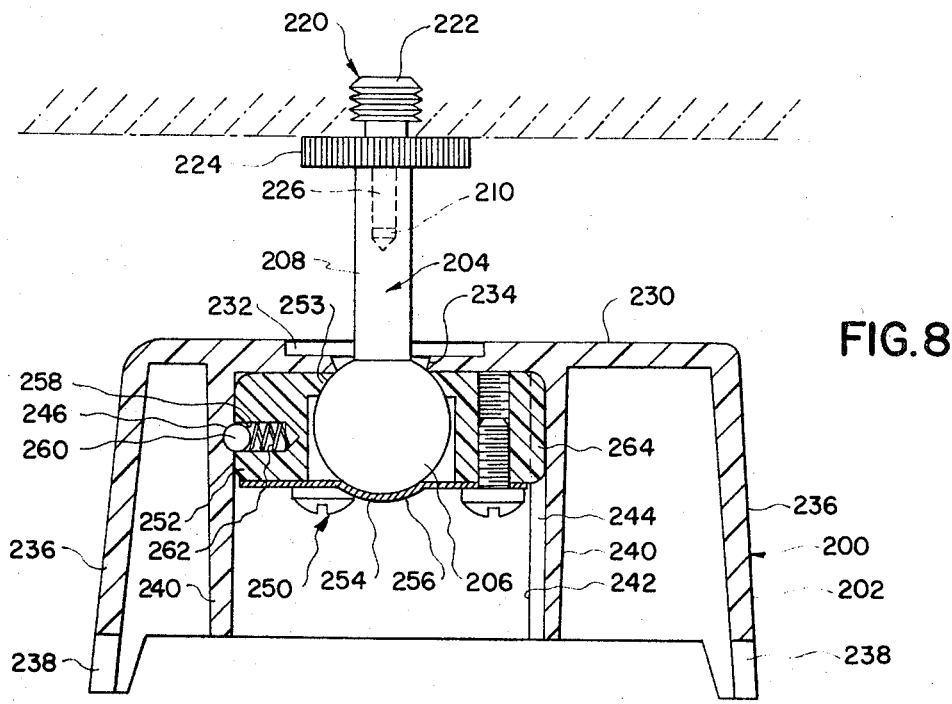
FIG. 8 is a sectional view of still another embodiment of a camera stand, with the connecting arm shown in its operative position.
Figure 9:
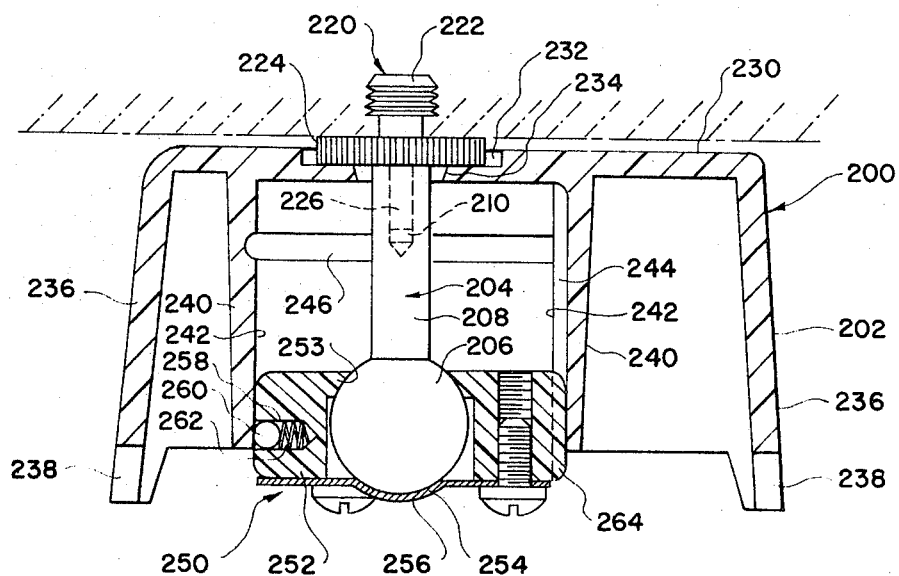
FIG. 9 illustrates the camera stand according to FIG. 8 with the connecting arm in its stored position.

FIGS. 8 and 9 illustrate an alterante embodiment of this invention in which the connecting arm is movable from an extended position in which it extends outward of the support base for engagement with the camera to a retracted storing position in which the connecting arm is moved downwardly within the connecting base. Camera support stand 200 consists of a support base 202 and a connecting arm 204. Arm 204 terminates in a ball end 206 at one end and includes a shaft 208 and a tapped aperture 210 at the opposite end of shaft 208 from ball end 206. A connector 220 consists of a screw end 222, a knurled flange 224 and a screw end 226. Screw end 226 is inserted into and engages aperture 210 so that connector 220 rests upon the end of shaft 208. Screw end 222 may then be inserted into and engaged with a tapped hole in a camera which is to be mounted upon support stand 200.

Base 202 has a top surface 230 in which is formed a recess 232 into which flange 224 is received, an aperture 234 through which shaft 208 of connecting arm 204 extends, and downwardly depending sidewalls 236, which terminate in feet 238. Base 202 further has an internal depending wall 240 which extends downwardly from top surface 230 of base 202 and defines a cylindrical guide surface 242. A guiding groove 244 is formed in clyindrical guide surface 242 and extends downwardly from upper surface 230 to the bottom of wall 240. A ring groove 246 is formed in cylindrical guide surface 242, which extends circumferentially around that surface.

Guide member 250 consists of a base 252 in which is formed a bearing 253 for supporting connecting arm 204. Ball end 206 of connecting arm 204 is clamped into bearing 253 of guide member 250 by means of a spring washer 254 with a spherical center portion 256.

Base 252 also has a plurality of recesses 258, into each of which a ball 260 and spring 262 is inserted when guide member 250 is assembled into base 202. Guide member 250 further has a rib 264, which extends outwardly of base 252 and is adapted to engage guiding groove 244 in guide surface 242 when guide member 250 is assembled into base 202.

The camera support stand is assembled by clamping a ball end 206 of a connecting rod 204 into guide member 250 by means of spring washer 254. Guide member 250 is then inserted into the cylindrical wall 240 which defines guide surface 242. Shaft 208 of connecting arm 204 is directed through aperture 234 of top surface 230 and guide member 250 is moved in an upward direction. Screw end 226 of connector 220 can then be inserted into the tapped hole 210 of shaft 208 and connector 220 is then screwed tightly to shaft 208. Guide member 250 may now be moved downwardly until flange 224 of connector 220 rests within recess 232 of top surface 230 of base 202. Connecting arm 204 is then in its stored position and is held within base 202 by the frictional engagement of balls 260 with sidewall 240. When it is desired to assemble the camera stand to a camera, guide member 250 is urged in an upwardly direction until balls 260 move into ring groove 246. Guide member 250 is guided in this upward movement by the engagement of rib 264 with guide channel 244 in sidewall 240. Connecting arm 204 may now be assembled to the camera by rotation of ball end 206 within bearing 253 of guide member 250.

Figure 10:
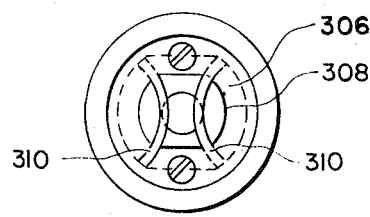
FIGS. 10 and 11 illustrate an adapter for use with the camera stand of FIG. 6, for assembling the camera stand to a photographic camera.
Figure 11:
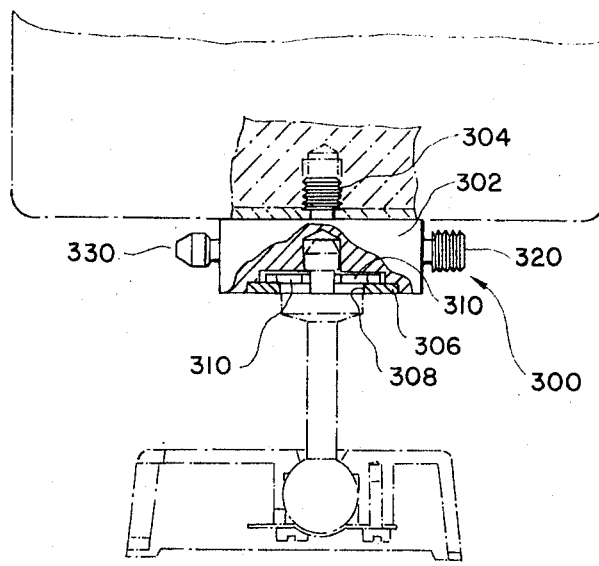

In order to increase the versatility of the camera stand, an adapter may be included which is illustrated in FIGS. 10 and 11. Adapter 300 is shown which may be utilized with the camera stand illustrated in FIGS. 6 and 7, with connecting arm 102 terminating in a stud 110 and a connecting lug 108. If the operator should now desire to utilize a camera which has a threaded hole for attachment of a tripod, adapter 300 may be used to assemble the camera to the camera support. Adapter 300 consists of a generally cylindrical support base 302 from which extends a threaded screw end 304. On the opposite side of base 302 from screw end 304 is a retaining disc 306, in the center of which is formed an aperture 308 through which stud 110 of connecting arm 102 may pass into the interior of adapter 300. A pair of opposed leaf-springs 310 are positioned within the adapter 300 so as to engage lug 108 and stud 110 as stud 110 enters the interior of adapter 300. Springs 310 hold lug 108 and stud 110 securely within adapter 300, as screw end 304 of adapter 300 is screwed into the camera. As illustrated, adapter 300 also includes optional additional connectors 320 and 330 on opposite sides of the adapter which are located for mounting a camera for taking a vertical shot with the camera support stand. Connector 320 is of the screw type illustrated in FIGS. 1-3, while connector 330 is of the latch and stud type illustrated in FIGS. 6 and 7.

Alternatively, an adapter may be made for use with a camera support stand of the type illustrated in FIGS. 1, 2 and 3, in which connecting arm 14 terminates in a screw end 22. An internal tapped hole is formed on the side of the adapter facing the support stand and a connector of the type illustrated in FIGS. 6 and 7 is positioned on the opposite side of the adapter. The adapter may now be used to connect a camera which utilizes an internal connector of the type illustrated in FIGS. 6 and 7 with a support stand of the type illustrated in FIGS. 1-3.

The invention has been described in detail with particular reference to the preferred embodiments thereof, but it will be understood that variations and modifications can be effected within the spirit and scope of the invention.

We claim:

1. A stand for supporting photographic apparatus comprising:
    a substantially hollow base having a generally flat upper wall, at least one side wall depending from said upper wall and bearing means extending from said upper wall into said hollow base and terminating in a first spherical socket, said upper wall further defining an aperture extending from said bearing means to said side wall and said side wall defining an aperture extending from said aperture in said upper wall;
    an apparatus support arm having a shaft, means at one end of said shaft for engaging the photographic apparatus and a ball end at the opposite end of said shaft, said ball end being adapted to be received by said first spherical socket with said support arm movable through said apertures between a stored position within said base and an extended support position; and
    resilient means comprising a generally flat spring defining a second spherical socket, said flat spring being engaged with said bearing means with said first and second spherical sockets in contact with said ball end and exerting a friction force for holding said ball end within said bearing means so that said support arm can be positioned between said stored and extended support positions.

* * * * *